(12) United States Patent
Bartz et al.

(10) Patent No.: US 6,701,342 B1
(45) Date of Patent: Mar. 2, 2004

(54) METHOD AND APPARATUS FOR PROCESSING QUALITY OF SERVICE MEASUREMENT DATA TO ASSESS A DEGREE OF COMPLIANCE OF INTERNET SERVICES WITH SERVICE LEVEL AGREEMENTS

(75) Inventors: Thomas G. Bartz, Loveland, CO (US); Stephen Janes, Fort Collins, CO (US); Sharad Singhal, Belmont, CA (US); Preeti Bhoj, Cupertino, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/488,476

(22) Filed: Jan. 20, 2000

Related U.S. Application Data

(60) Provisional application No. 60/172,975, filed on Dec. 21, 1999.

(51) Int. Cl.[7] ............................................. G06F 15/16
(52) U.S. Cl. ...................... 709/200; 201/202; 201/203; 201/217; 201/223; 201/224; 370/395.21
(58) Field of Search ................................ 709/200, 203, 709/202, 225, 204, 217, 201; 370/252, 395.21; 713/201

(56) References Cited

U.S. PATENT DOCUMENTS

| | | | | |
|---|---|---|---|---|
| 6,147,975 A | * | 11/2000 | Bowman-Amuah | |
| 6,182,110 B1 | * | 1/2001 | Barroux | ...................... 709/201 |
| 6,195,697 B1 | * | 2/2001 | Bowman-Amuah | |
| 6,269,401 B1 | * | 7/2001 | Fletcher et al. | |
| 6,304,892 B1 | * | 10/2001 | Bhoj et al. | |
| 6,321,264 B1 | * | 11/2001 | Fletcher et al. | |
| 6,324,647 B1 | * | 11/2001 | Bownam-Amuah | |

* cited by examiner

*Primary Examiner*—Hosain Alam
*Assistant Examiner*—Oanh Duong

(57) ABSTRACT

A method and apparatus are provided for evaluating Service Level Agreements (SLAs) that describe the level of services that are to be provided to customers by Internet Service Providers (ISPs) or Enterprise Service Providers (ESPs). The method and apparatus are utilized to measure the quality of service being provided to customers and to determine whether or not the quality of service is in compliance with an SLA that characterizes the level of service to be provided to customers. Such services include, for example, electronic mail (e-mail), Voice-Over-IP (Voice Over Internet protocol), networking services and web hosting.

32 Claims, 9 Drawing Sheets

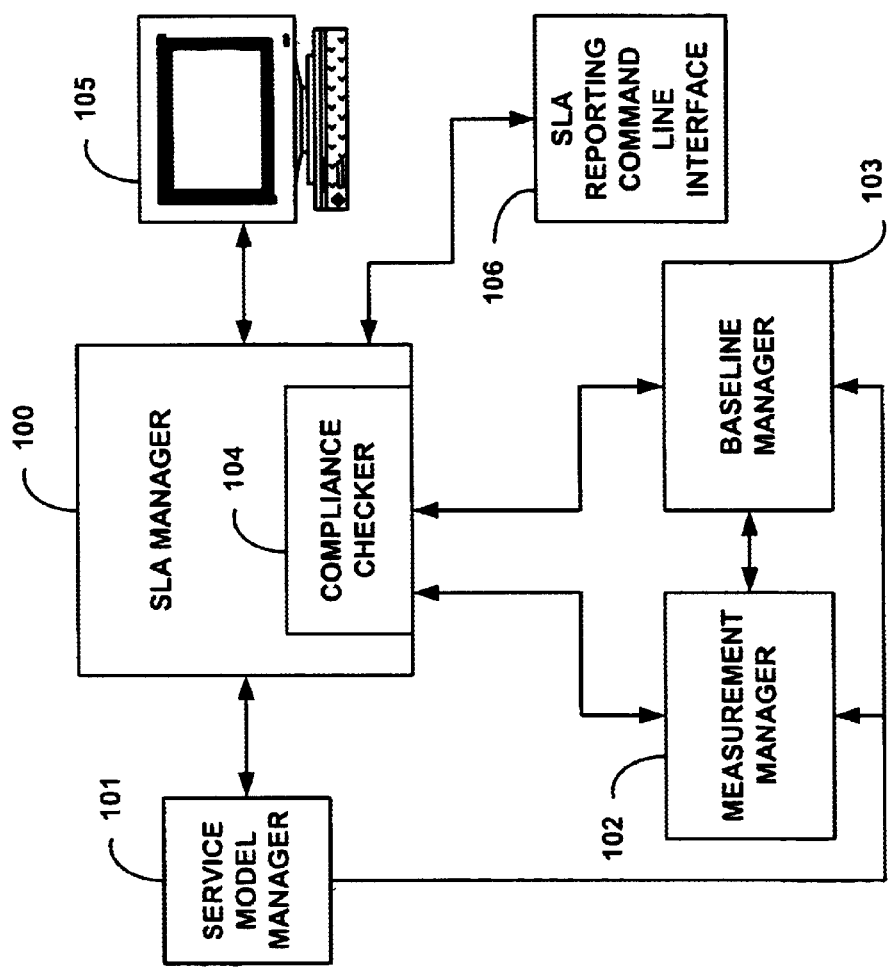

METHOD AND APPARATUS FOR PROCESSING QUALITY OF SERVICE MEASUREMENT DATA TO ASSESS A DEGREE OF COMPLIANCE OF INTERNET SERVICES WITH SERVICE LEVEL AGREEMENTS

CROSS-REFERENCE TO RELATED APPLICATION

This application claims the benefit and filing date of U.S. Provisional Application Ser. No. 60/172,975, filed Dec. 21, 1999, which is incorporated herein by reference in its entirety.

TECHNICAL FIELD OF THE INVENTION

The present invention relates to Internet services and, more particularly, to a method and apparatus for measuring the quality of service being provided to customers and for determining whether or not the quality of service is in compliance with service level agreements (SLAs) that characterize the level of service to be provided to customers.

BACKGROUND OF THE INVENTION

Internet service providers (ISPs) provide a variety of Internet services to customers such as, for example, electronic mail (e-mail), Voice-Over-IP (Voice Over Internet protocol), networking services and web hosting. Service Level Agreements (SLAs) are agreements that identify the level of a particular service that is to be provided by the ISP to a customer. Generally, SLAs guarantee a quality of service to the customer. If the quality of service identified in the SLA is not met, the customer and the ISP typically would like to know that the quality of service was not met. If a given SLA has not been complied with, the ISP may want to know the reason for noncompliance so that it can correct the problem that resulted in the violation of the SLA. The ISP may credit the customer's account to compensate the customer for the failure to provide the agreed-upon service level.

Although network monitoring tools exist that allow ISPs to monitor the quality of various services being provided to their customers, the tools that are currently available generally only allow compliance or noncompliance with relatively simplistic SLAs to be evaluated. Such SLAs are very limited in that they simply identify a threshold value that will be used to determine whether a particular level of service has or has not been provided over a particular period of time. These SLA compliance criteria are commonly referred to as service level objectives (SLOs). A determination will be made as to whether or not the SLA has been violated based on whether or not the SLO has been met.

Utilizing relatively simplistic SLAs limits the degree to which a particular SLA can be adapted or customized to meet the needs of customers and ISPs. For example, it may be desirable to configure an SLA for an e-mail service that is guaranteed to be only 50% operational between the hours of 2:00 a.m. and 5:00 a.m., provided the e-mail service is guaranteed to be 98% operational for all other time periods and to never be inoperative for more than 10 consecutive minutes during those hours. The ISP may be willing to charge a significantly lower monetary rate for such a service than if the SLA required that the e-mail service be operational at least 98% of the time 24-hours a day. The customer may be willing to accept a lower level of service in exchange for paying a lower monetary rate.

Currently, SLAs do not provide this type of flexibility, which severely limits the ability of the SLAs to meet the needs of the ISPs and their customers. It would be desirable to provide a tool that would enable ISPs to monitor the quality of service being provided to customers in a way that would enable greater flexibility with respect to the service level objectives (SLOs) of the SLAs. It would also be desirable to provide a tool that is flexible with respect to the manner in which the quality of service measurement data is processed in order to accommodate increased variability of the SLOs and increased overall flexibility of the SLAs.

SUMMARY OF THE INVENTION

The present invention provides a method and apparatus for evaluating Service Level Agreements (SLAs) that describe the level of services that are to be provided to customers by Internet Service Providers (ISPs) or Enterprise Service Providers (ESPs). The method and apparatus are utilized to measure the quality of service being provided to customers and to determining whether or not the quality of service is in compliance with an SLA that characterizes the level of service to be provided to customers. Such services include, for example, electronic mail (e-mail), Voice-Over-IP (Voice Over Internet protocol), networking services and web hosting. In accordance with the present invention, an SLA is configured as a data structure that includes a logical expression of one or more Service Level Objectives (SLOs). The method and apparatus of the present invention together comprise an SLA management tool that retrieves and evaluates measurement data associated with each SLO to determine whether or not any SLO has been violated. The SLO evaluation results are then utilized in the logical expression of the SLA to determine whether or not the SLA is compliant.

The SLA management tool of the present invention preferably is capable of generating SLA reports that provide information relating to SLA compliance evaluations. The SLA reports preferably also include information relating to violations of SLOs associated with the SLA. The SLA management tool of the present invention is also capable of configuring SLAs based on user input and/or SLA templates.

These and other features and advantages of the present invention will become apparent from the following description, drawings and claims.

BRIEF DESCRIPTION OF THE DRAWINGS

FIG. 7 is a functional block diagram that illustrates the relationship between the components of the SLA management and reporting tool of the present invention in accordance with the preferred embodiment.

DETAILED DESCRIPTION OF THE INVENTION

Figure 1:
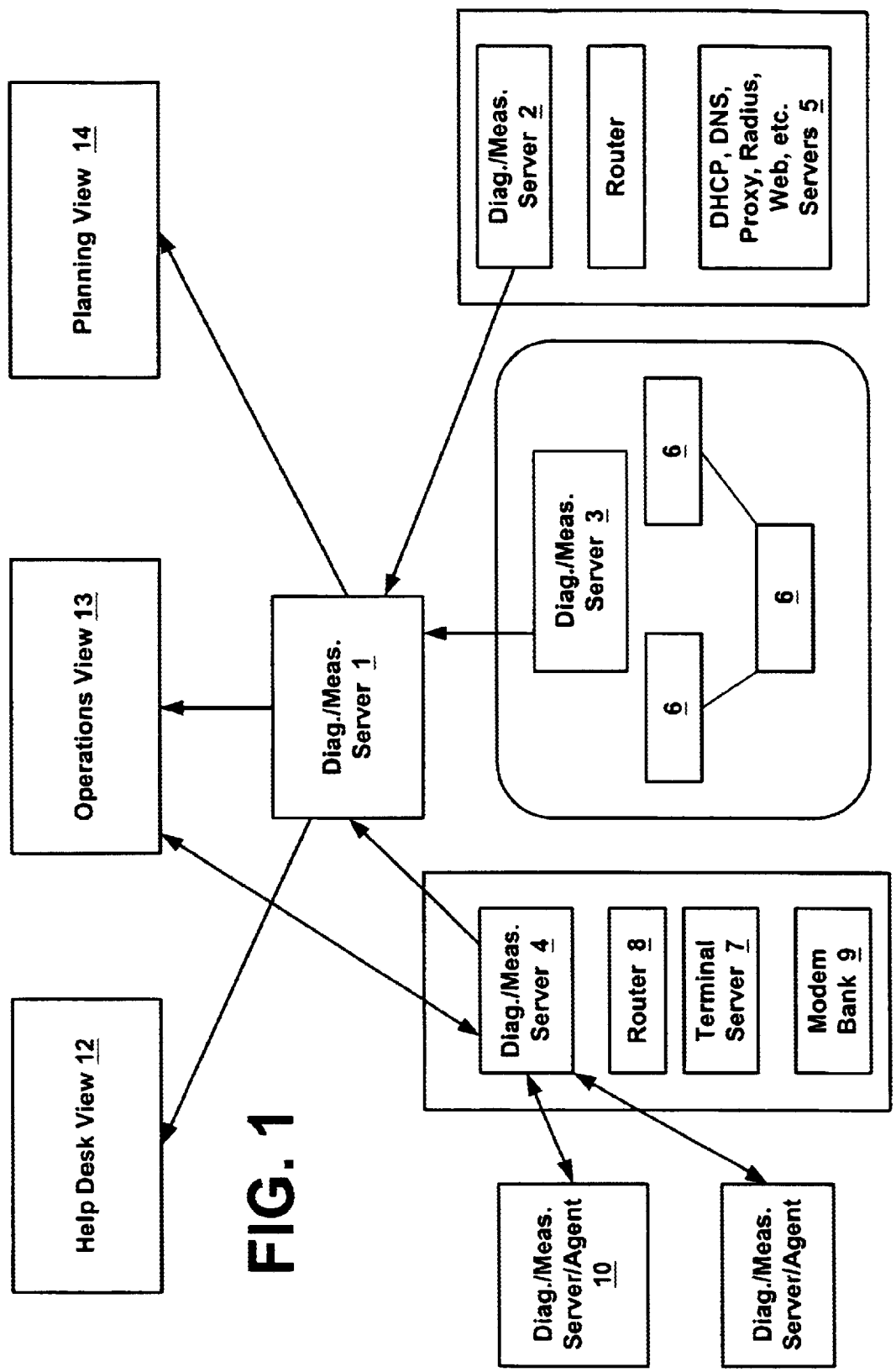
FIG. 1 is an illustration of various resources that are utilized by an Internet service provider (ISP) in providing various Internet services to customers.

A business solution provided by Agilent Technologies and marketed under the name Firehunter is used as a monitoring and measurement tool by Internet Services Providers (ISPs) and Enterprise Service Providers (ESPs) to enable them to monitor and manage the performance and availability of Internet services being provided to customers. Generally, the Firehunter tool tests resources throughout a system model and acquires diagnostic/measurement data from those resources. The Firehunter tool resides on a diagnostic/measurement server that captures, aggregates, and correlates service performance metrics to enable the ISP or ESP to assess the end-to-end performance and availability of Internet services (e.g., e-mail, web hosting, etc.) being provided to customers. The system model monitored by the Firehunter tool comprises all of the resources end-to-end throughout the network that are utilized to provide services to the customers of the ISP or ESP. These resources include the portions of the backbone of the network that are utilized in providing those services (e.g., routers) as well as various servers (e.g., DNS server, proxy server, web server, DHCP server, etc.) that are utilized in providing services to the customer.

The present invention relates to a Service Level Agreement (SLA) management tool that can be integrated with a tool such as the Firehunter monitoring and measurement tool. The SLA management tool of the present invention is capable of utilizing the measurement data captured, aggregated and correlated by the Firehunter tool at the diagnostic/measurement server of the ISP to provide SLA reports that describe the actual quality of services that customers are receiving. However, although the SLA management tool of the present invention can be used with the Firehunter monitoring and measurement tool, it should be noted that the SLA management tool of the present invention can be used with other monitoring and measurement tools. Furthermore, the monitoring and measurement tool of the present invention may also be configured to perform the monitoring and measurement tasks in addition to processing the measurement data (i.e., serve performance metrics) to generate the SLA reports of the present invention. Therefore, although it is preferable that the SLA management tool of the present invention be integrated with the Firehunter tool, this is not required.

Prior to discussing the various aspects of the present invention, a general discussion of the manner in which the Firehunter monitoring and measurement tool collects service performance measurement data will be provided. Once the manner in which these service performance measurement data is collected has been provided, a detailed discussion of the manner in which the SLA management tool of the present invention processes this data to assess SLA compliance will be provided.

Since the SLA management tool of the present invention preferably is utilized in conjunction with the Firehunter monitoring and measurement tool, the SLA management tool of the present invention will be described with respect to its use as an integral component of the Firehunter monitoring and measurement tool. Three Firehunter products are currently available on the market, namely, the Firehunter/L product, the Firehunter product and the Firehunter/PRO product. Each of these products is a monitoring and measurement tool that is capable of capturing, aggregating and correlating service performance metrics. The manner in which these tools can be employed to perform these tasks is described in the Hewlett-Packard Firehunter Concepts Guide printed in April 1999 and having part no. 5969-2201, which is incorporated by reference herein in its entirety.

The Hewlett-Packard Firehunter Concepts Guide also discloses implementation of the SLA management tool in conjunction with the Firehunter and Firehunter/PRO monitoring and measurement tools. Therefore, a detailed discussion of the manner in which the Firehunter monitoring and measurement tools can be utilized to capture, aggregate and correlate service performance metrics will not be provided herein. Those skilled in the art will understand the manner in which a monitoring and measurement tool such as the Firehunter, Firehunter/L and Firehunter/PRO monitoring and measurement tools can be utilized in conjunction with the SLA management tool of the present invention to assess and report SLA compliance.

FIG. 1 is an illustration of various resources that are utilized by an ISP in providing various Internet services to customers. The Firehunter monitoring and measurement tool is a software tool that resides on a diagnostic/measurement server (hereinafter DMS) 1 that is utilized by an ISP to manage its service model. A service model is an internal representation of the resources required to deliver a service being managed by a service provider. The service model includes information such as the resources required to deliver a service, their properties, the relationships among the resources, and the tests and measurements required to characterize the service levels being delivered.

The DMS 1 collects measurement data from various resources throughout the network. For example, the DMS 1 is capable of collecting measurement data from other DMS's 2, 3 and 4 throughout the network. The DMS's 1, 2, 3 and 4 are hierarchically networked to enable any of the DMS's to access information stored on any other DMS servers. The DMS 1 is capable of obtaining measurement information from various resources throughout the network, such as, for example, DHCP servers, DNS servers, proxy servers, radius servers, web servers, etc., which are collectively represented by numeral 5. The DMS 1 is also capable of obtaining measurement information from various network backbone resources such as, for example, routers 6, and from point-of-presence (POP) resources such as, for example, terminal server 7, router 8 and modem bank 9. The DMS 1 is also capable of collecting measurement data from client premises equipment 10 and 11.

The Firehunter monitoring and measurement tools utilize agents to gather measurements associated with the performance, availability and other quality levels of services being provided to customers. Each agent is comprised of (1) tests that determine which measurements the agents should take, and (2) an agent controller that determines which tests the agents are to run, how frequently the agents are to run those tests and where the agents are to send the collected measurements data. There are two types of agents, namely, those that take "active" measurements and those that take "passive" measurements. "Active" measurements create a stimulus in order to measure the response of a service to that stimulus. For example, an agent might emulate a client and interact with the server associated with the client. On the other hand, "passive" measurements monitor log files and system utilities to gather additional information available only at a server. The passive measurements are gathered by using an agent that resides on the machine from which measurements are being obtained. As an agent collects measurement samples, it sends them to the DMS 1 at intervals defined by the service model.

The DMS 1 processes the collected measurement data to determine whether resources of the system model are operating properly and, if not, which resources are not operating properly. The views 12, 13 and 14 correspond to views of the service model represented by the resources shown in FIG. 1. These views can be used by a manager of the service to determine whether resources of the service are operating properly, to determine where problems may be occurring in the service and to plan actions to ensure that the service is operating properly.

As stated above, the quality of service level (QoS) that is to be provided to a given customer is defined by certain terms that are set forth in a service level agreement (SLA) associated with the customer. The QoS measurement data relating to SLAs is stored on a time basis in the DMS 1 database (not shown). The QoS measurement data corresponding to any SLA can be processed by the SLA management tool of the present invention, which is a software tool that preferably resides on the DMS 1. The SLA management tool of the present invention is capable of processing the QoS measurement data and of generating SLA reports that enable the ISP to determine whether or not a particular SLA has been violated. Information relating to SLA compliance or noncompliance in an SLA report can be displayed in various formats and for various compliance periods, as described below in detail.

Figure 2:
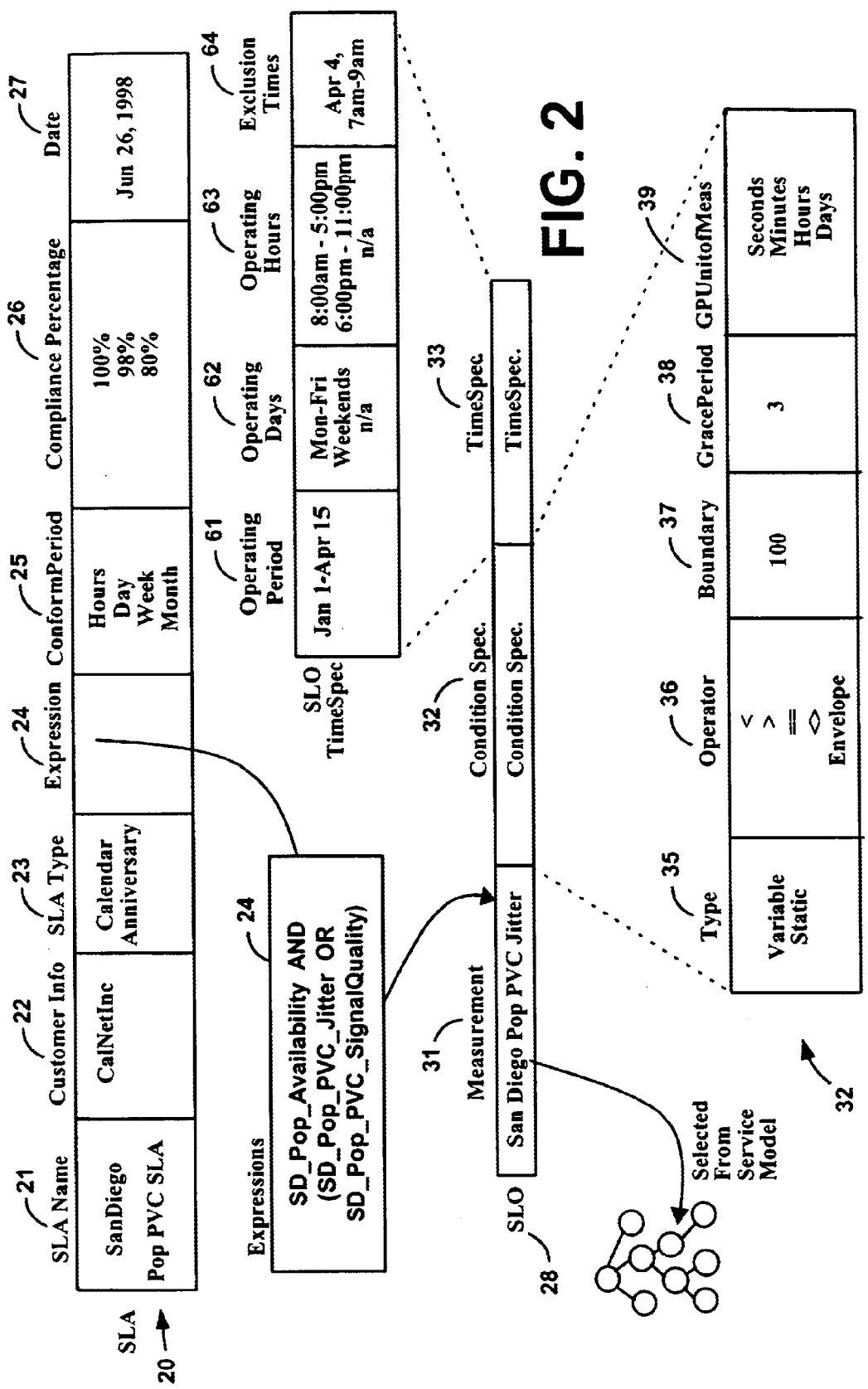
FIG. 2 illustrates the overall configuration of a Service Level Agreement (SLA) in accordance with the preferred embodiment of the present invention.

The overall configuration of an SLA in accordance with the present invention is illustrated in FIG. 2 and is represented by numeral 20. Each SLA preferably is defined by an SLA Name 21, a Customer Profile 22, an SLA Type 23, an Expression 24, a ConformancePeriod 25, a Compliance Percentage 26, and a Contract Date 27. The Customer Profile 22 preferably includes the customer's name (e.g., a company name), address, phone number, and contact. Each Expression 24 corresponds to a logical operation performed on other logical expressions and/or on the SLOs 28 that are comprised by the SLA 20. Each SLO 28 preferably includes a Measurement 31, a Condition Spec. 32 and a TimeSpec 33. Each Condition Spec. 32 preferably is defined by a Type 35, an Operator 36, a Boundary 37, a Statistic 40, a GracePeriod 38 and a Grace Period Unit of Measure (GPUnitofMeas) 39. Each TimeSpec. 33 of an SLO 28 preferably is defined by an Operating Period 61, Operating Days 62, Operating Hours 63 and Exclusion Times 64. Some of the components and sub-components of the SLA 20 preferably are implemented as objects to enable the SLA itself and certain components of the SLA, such as the expression 24, the SLO 28, the SLO conditions 32 and the SLO time specifications 33 to be re-usable across SLAs and SLOs.

The SLOs are the fundamental components of the SLAs. The SLA 20 of the present invention is comprised of one or more SLOs. The Measurement Object 31 of the SLO 28 corresponds to any measurement that can be used as a basis for an SLO. The measurement preferably is referenced by its name in the service model. For exemplary reasons, the measurement object 31 has been given the name San Diego POP PVC Jitter, which indicates a particular resource and a particular measurement. The SLO 28 characterizes the criteria (e.g., the condition and time specifications) that determine when a measurement violates the SLO 28. Conditions of these criteria will be described below in detail.

Figure 3:
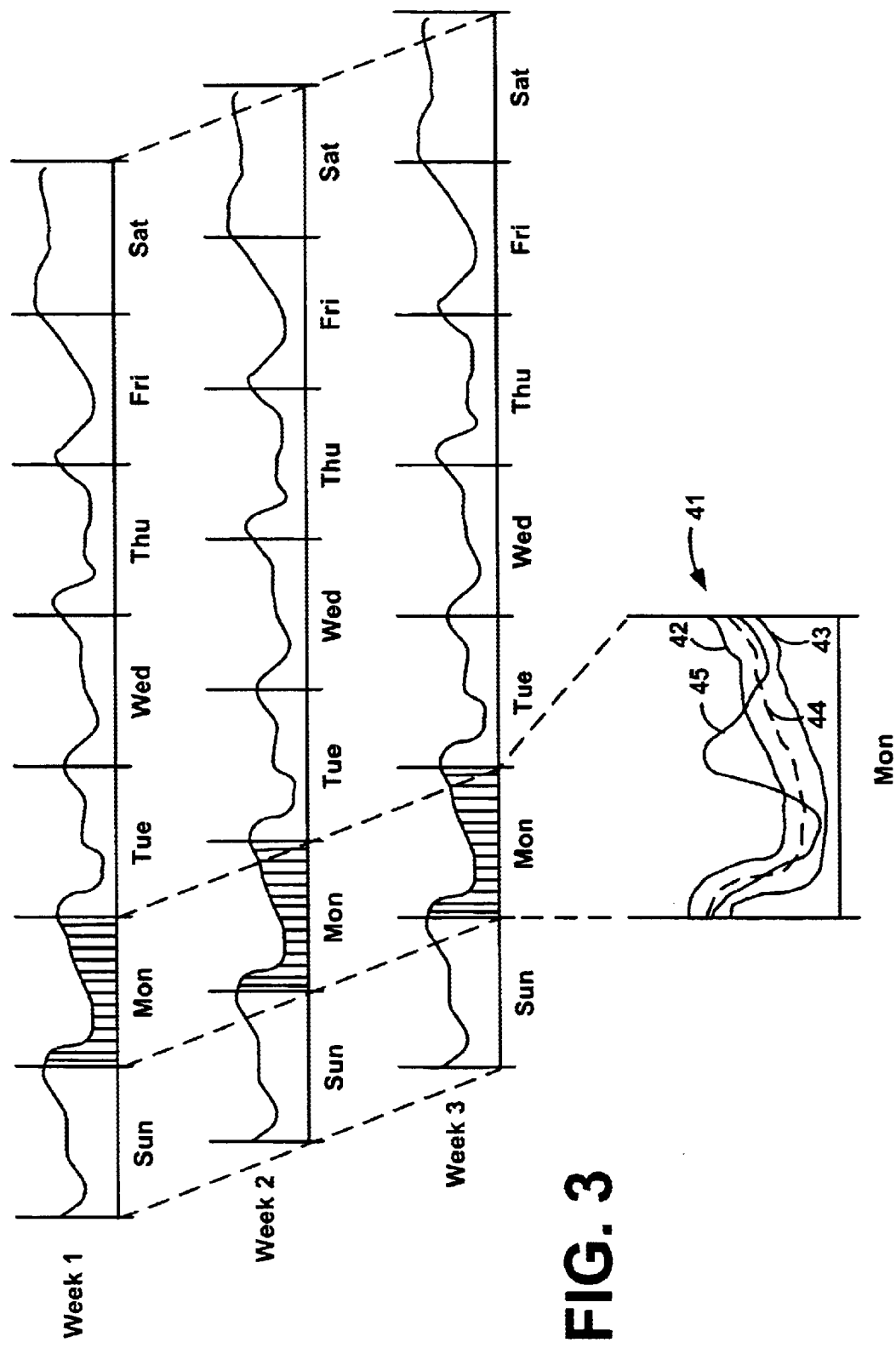
FIG. 3 illustrates the manner in which baseline measurements can be utilized in specifying conditions of a Service Level Objective (SLO).

The condition specification (Condition Spec.) 32 of the SLO 28 corresponds to the condition that a measurement is compared against to determine if the SLO 28 has been violated. Conditions can be defined as static, variable, or variable envelope. Variable conditions are founded on baseline statistics that are collected by the DMS 1 to determine "normal", or historical, behavior for the particular measurement at various times of the day for each day of the week. FIG. 3 demonstrates examples of baseline statistics that have been obtained over three consecutive weeks for Monday. The baseline statistics correspond to some quality-of-service measurement of a resource of the service. The plot 41 illustrates four different curves, namely, an upper threshold curve 42, a lower threshold curve 43, a normal baseline curve 44 and a curve that corresponds to the current measurement for Monday of a given week. The normal baseline 44 has been compiled from the statistical measurement data and corresponds to the normal behavior of the particular resource over the three week period during which the baseline statistics were collected.

The upper and lower thresholds 42 and 43, respectively, are curves that generally track the baseline curve 44, but which provide some deviation from the normal behavior of the resource such that a violation of the corresponding SLA cannot occur unless the current measurement exceeds the upper threshold 42 and/or goes below the lower threshold 43. The manner in which the baseline and the upper and/or lower thresholds can be utilized is demonstrated by FIGS. 4B and 4C.

Figure 4A:
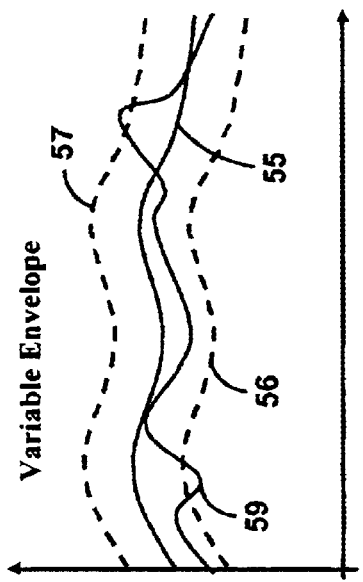
FIGS. 4A–4C illustrate various service level objective (SLO) conditions that may be specified in the SLA configuration shown in FIG. 2.

Static conditions specify an operator and a boundary (e.g. >5). The measurement is compared against the boundary based upon the operator, and is in violation if the resulting condition is true. FIG. 4A illustrates a static boundary condition. The boundary 46 corresponds to a particular level of service for a particular measurement. The curve 47 corresponds to the actual measurement data for a particular resource. If the actual measurement data 47 crosses the boundary service level 46, the static boundary condition has been violated. Thus, it can be seen that the static boundary condition is a very basic type of boundary condition.

Variable conditions specify an operator and one of the baseline statistics (average, minimum, or maximum) along with an offset (e.g., ">(average −1)"). This allows one to make the baselines more stringent or lax. In this example if the measurement is greater than the average-1, then a violation exists. Note also that one may optionally specify a percentage (e.g., ">(99% of the average)"), meaning that if the measurement is greater than 99% of the average baseline, then a violation exists.

Figure 4B:
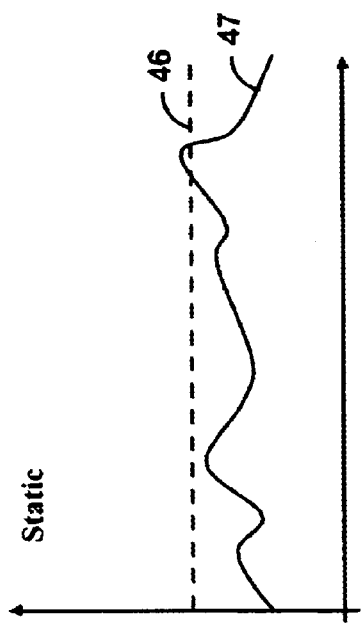

FIG. 4B illustrates a variable condition, which is defined by a baseline level 52 and an upper boundary level 53. The current measurement is represented by the curve 54. The variable condition is violated when the current service level 54 is operating above the upper boundary threshold 53. Therefore, the upper boundary threshold 53 corresponds to the maximum degree that the current measurement 54 can deviate from the baseline level 52.

Variable Envelope conditions (FIG. 4C) specify a baseline statistic and a boundary (e.g., "within an envelope of plus or minus 10 of the average"). The boundary is added to and subtracted from the baseline 55, resulting in a range that the measurement must fall within. In this case, if the measurement 59 is greater than or equal to the average+10 (upper boundary 57), or less than or equal to the average−10 (lower boundary 56), then a violation exists.

Figure 4C:
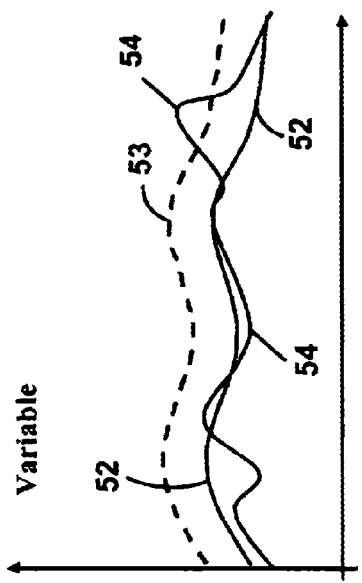

Each of the conditions shown in FIGS. 4A–4C can be defined by the conditions specification 32. The grace period 38 is a consecutive, or uninterrupted, interval of time over which the condition must be violated before the SLO 28 itself is considered to be violated. This is an important aspect of the SLA 20 of the present invention due to the bursty nature of traffic over the Internet. Burstiness may lead to short-lived, intermittent periods where a condition is in violation, but which nevertheless is tolerable to users due to their short-lived duration. Thus, the grace period ensures that only sustained condition violations result in true SLO violations. The grace period unit of measurement, "GPUnitofMeas. 39", designates the unit of time to be used for the grace period 38. For example, the conditions specification 32 may designate a grace period of 3 and the grace period unit of measurement 39 of minutes. Other options for grace period unit of measure are seconds, hours or days. The variable conditions represented by FIGS. 4B and 4C allow greater flexibility in defining the events that correspond to an SLO violation. Utilizing grace periods in conjunction with these conditions further enhances this flexibility by ensuring that the condition is not violated unless it has been violated for a time period that exceeds the grace period.

The SLO time specification 33 corresponds to the operating time when the SLO 28 is intended to be in effect and is to be evaluated. As illustrated in FIG. 2, an operating period 61 can be set (e.g., a range of calendar months and days), which corresponds to the period during which the SLO 28 is in effect and thus is to be evaluated for non-compliance. During the operating period, operating days 62 and operating hours 63 can be designated, which further limit the time periods during which the SLO is intended to be in effect and thus is to be evaluated. For demonstrative purposes, an operating period of January 1 through April 15 for Monday through Friday, 8:00 a.m. through 5:00 p.m., and weekends 6:00 p.m. through 11:00 p.m. has been designated. Therefore, in this example, the SLO is in effect from January 1 through April 15, Monday through Friday, 8:00 a.m. through 5:00 p.m. and weekends 6:00 p.m. through 11:00 p.m.

The SLO will only be evaluated for non-compliance during periods designated by the SLO time specification 33. Therefore, the SLO is not to be evaluated for non-compliance Monday through Friday during the hours after 5:00 p.m. and before 8:00 a.m. or on weekends from 11:00 p.m. through 6:00 p.m. Exclusion times 64 can also be set, which designate time periods during which the SLO 28 is not to be evaluated. For example, an exclusion time of Friday, January 21, can be designated even though January 21 falls within the designated operating period and is a designated operating day. The SLO will not be evaluated on this day.

Once the SLO(s) 28 of the SLA 20 have been established, they are logically combined through the SLA expression 23. An SLA expression is defined from one or more SLOs and/or other SLA expressions. Also, SLA expressions may be built up to combine multiple SLOs through logical AND, OR and NOT expressions. Also, various SLOs that have been defined in the SLA may be brought together into a single statement that comprises all of the requirements of the SLA., This allows SLOs corresponding to the same or different resources to be evaluated for the same instants in time over a particular period of time. For example, first and second SLOs might each require the 100% availability of one particular server, Server A, ORed with the 100% availability of another particular server, Server B, with overall compliance being required 90% of the time. This example specifies that at least one server must be up or a violation occurs. Thus, calculations not only occur on a per SLO basis, but also over time across all SLOs and expressions. This feature of the present invention is advantageous because it enables conditions to be evaluated at any given instance in time.

It should also be noted that different SLOs may be based on the same measurement, which allows the SLA 20 to specify different conditions for a particular measurement at different operating times (e.g., one level of quality during the week and another level of quality for weekends). Once all of the SLOs of interest have been combined into an overall SLA expression, they are brought together into the overall SLA definition. The SLA definition includes the Contract Date 27, which is when the SLA 20 initially goes into effect, and the conformance period, "ConformPeriod" 25, which defines the period of time over which an SLA is to be evaluated to determine if compliance has been achieved. Examples of conformance periods are one month, five days, twelve hours, two weeks, etc. The SLA conformance period 25 is the timeframe over which the SLO compliance values are combined into one overall SLA compliance value.

The SLA Type 23 specified in the SLA definition is used to determine when an SLA conformance period 25 begins. If the SLA is an "Anniversary" type SLA, for example, the conformance period 25 begins on an anniversary of the contract date. For example, conformance periods would begin on the fourteenth of each month for a contract date of Apr. 14, 1998 assuming a monthly conformance is used. The Conformance Period 25 corresponds to the periodic intervals during which the SLA will be evaluated for compliance. These intervals can be set to an hourly, daily, weekly or monthly interval. A "Calendar" SLA type dictates that conformance periods will begin on the first of the month for a monthly conformance period, on the first day of the week for a weekly conformance period, at midnight assuming a daily conformance period, etc.

An overall "Required Compliance Percentage" 26 can also be specified for the SLA 20. Preferably, by default, the top level, or root, SLA expression (in all of the SLOs comprised by the SLA) must be met 100% of the time in order for the SLA to be met. However, the compliance percentage 26 can be set to a lower value (e.g., 98% or 95%) to provide some additional leeway in meeting the SLA criteria. This is one way in which different tiers of SLA compliance can be offered to different customers in accordance with the present invention.

The present invention provides a reporting period specification, which allows reporting periods to be designated as "FIXED", "ANCHORED", or "FLOATING." "FIXED" reporting periods have both a start and an end time. The start time is preferably rounded to the beginning of the conformance period in which it falls. Likewise, the end time is preferably rounded to the end of the conformance period in which it falls. This rounding capability allows the user to select a time period without having to calculate exactly when a conformance period started or ended. This feature of the present invention is useful in generating various reports, such as quarterly reports, for example. "ANCHORED" reporting periods have a start time, and a flag, which specifies whether or not the current conformance period is included in the reporting period. The Anchored reporting periods are useful in generating reports from a given point in time up to the current time (e.g., a current quarterly report).

"FLOATING" reporting periods have a "reporting period" specified along with a multiplier indicating how many recent historical "reporting periods" constitute the time range for the report. (Preferably, by default, the reporting period is the same duration as the SLA conformance period, although any time span can be assigned). Optionally, a flag can be used to indicate whether or not the current reporting period is included. If the current reporting period is included, then another flag is used to specify whether or not the current conformance period should be included. The reason that this period "floats" is that it is always relative to the current time, i.e., the start and end dates automatically and dynamically change based upon current time. This type of reporting period is useful for generating historical reports, such as, for example, monthly reports and month-to-date reports, regardless of what the conformance period may be.

Figure 5:
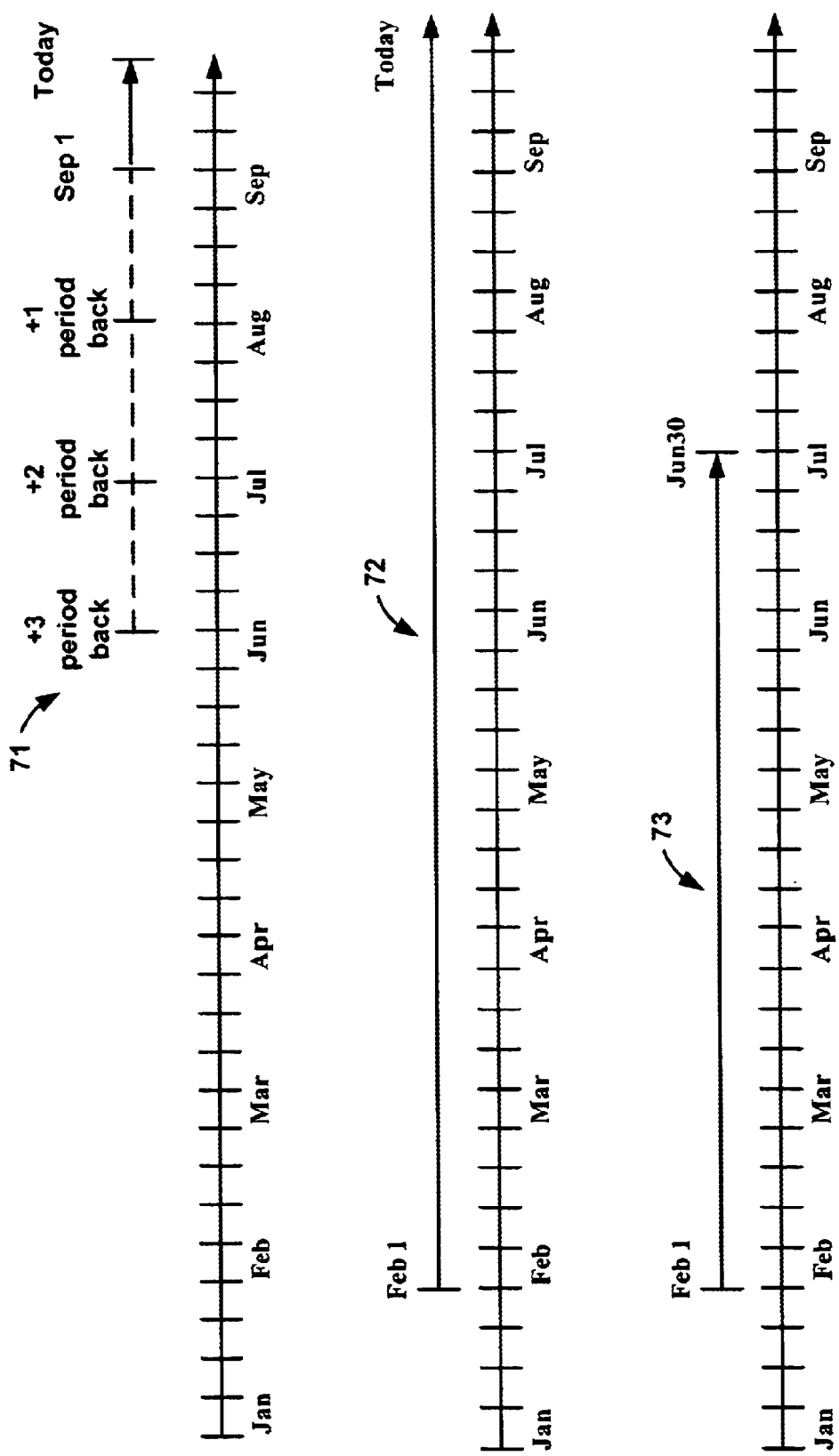
FIG. 5 illustrates the manner in which reporting periods can be specified in the SLA definition shown in FIG. 2.

FIG. 5 illustrates these various types of reporting periods for an Anniversary type SLA having a contract date of January 1. The top time line 71 demonstrates a "FLOATING" reporting period. It corresponds to a monthly conformance period and demonstrates that SLA compliance can be assessed and reported for past conformance periods and for the current conformance period, even if the current conformance period is incomplete. The time line 71 assumes that the current date is some day in September after September 1 and illustrates that compliance can be assessed and reported for the month of September up to the current date and for past conformance periods. For exemplary purposes, only three full past conformance periods are shown, namely, the months of June, July and August. In contrast, the time line 72 demonstrates an "ANCHORED" reporting period from a fixed date in the past (e.g., February 1 through the current date). The time line 73 demonstrates a "FIXED" reporting period that extends from some fixed date in the past (e.g., February 1) through some other fixed date from the past (e.g., June 30). These time lines demonstrate that the reporting periods may be set with great flexibility to enable compliance of the SLA to be evaluated and reported for virtually any period of time desired.

Figure 6:
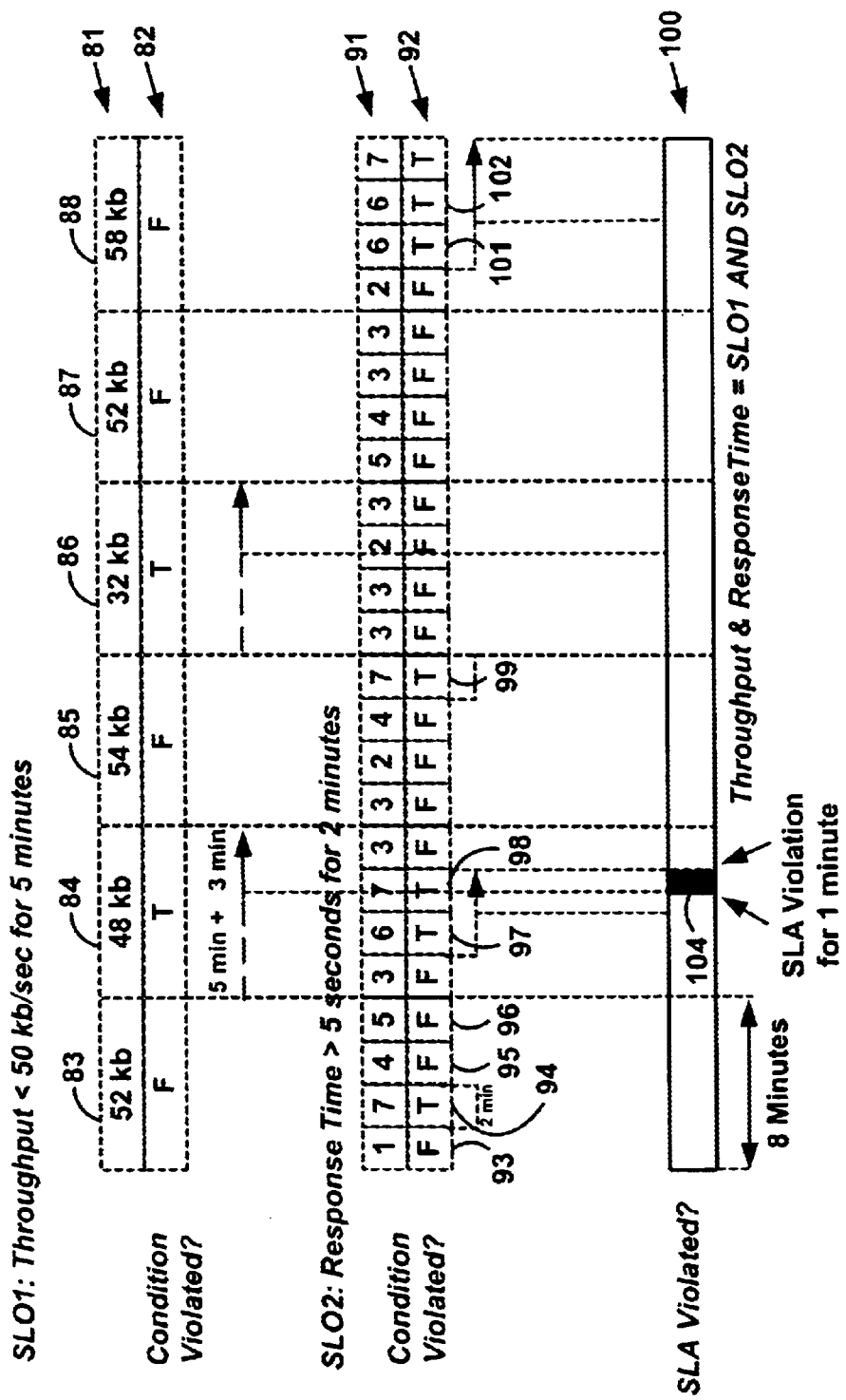
FIG. 6 illustrates the manner in which SLOs can be combined into a logical expression within the SLA.

FIG. 6 illustrates an example of two SLOs that have been combined into the logical expression of an SLA. SLO1 corresponds to the throughput associated with a particular resource of the system model. SLO2 corresponds to the response time associated with a particular resource of the managed service. SLO1 states that if the throughput falls below 50 kb/sec for more than 5 minutes, SLO1 is violated. SLO2 states that if the response time is greater than 5 seconds for more than 2 minutes, SLO2 is violated. The overall SLA logical expression is SLO1 AND SLO2. Therefore, if SLO1 and SLO2 are violated, the SLA is non-compliant.

The top two rows 81 and 82 in FIG. 6 correspond to the throughput values and the evaluation results, respectively. Each column in rows 81 and 82 correspond to an 8 minute interval. A true indication in row 82 corresponds to a violation of SLO1. Therefore, columns 84 and 86 correspond to violations of the condition of SLO1. Both of these columns correspond to reductions in throughput below 50 kb/sec for more than 5 minutes, thus resulting in violations of the condition of SLO1. It should be noted that in this example, the grace period is less than the measurement interval. Consequently, every measurement value that violates the condition of SLO1, results in a corresponding SLO violation. For most SLOs, the grace period will typically span multiple measurement intervals. Rows 91 and 92 correspond to the response time and the evaluation results, respectively, associated with SLO2. Each column in rows 91 and 92 corresponds to a 2 minute time interval. Columns 94, 97, 98, 99, 101, 102 and 103 correspond to increases in the response time above 5 seconds for at least 2 minutes, thus resulting in violations of the condition of SLO2. Columns 93, 95 and 96 are identified simply to show periods of compliance of the condition of SLO2.

To determine SLO Compliance, grace periods may be taken into account. For this example, SLO 1 goes into non-compliance 5 minutes into column 84 and remains non-compliant for 3 minutes (i.e., to the end of the measurement period.) SLO 2 goes into non-compliance when the condition is violated for a sustained period of at least two minutes. Thus, SLO 2 is non-compliant during the time periods represented by columns 98, 102 and 103. SLA non-compliance is next determined through the logical combination of non-compliant intervals of SLOs 1 and 2. Since SLO 1 and SLO 2 are "ANDed," the overall SLA is found to be non-compliant for the 1 minute period that begins halfway into column 98 and persists through the end of column 98. This is the only period of time during which both SLO1 and SLO2 are in violation.

The example of FIG. 6 is illustrated merely to demonstrate the manner in which SLOs can be logically combined in the logical expression of the SLA. However, many SLOs can be combined in the logical expression of the SLA and the conditions associated with the SLOs can be relatively complex. The following example demonstrates the manner in which SLOs can be configured to meet practical, and somewhat complex, objectives. The following example also demonstrates the manner in which these SLOs can be integrated into the SLA and logically combined.

Example: A client has contracted a Web hosting service with an ISP. The service consists of two servers, Server 1 and Server 2, and collectively, an SLA is defined for them. The service is to be operational around the clock, Monday through Friday. The client wants guaranteed response times during the hours of 8:00 a.m. through 5:00 p.m., and will remove the compliance requirement during evening hours. To be compliant, the response time must be no greater than 5 seconds above the normal response time, for any 10 consecutive minute period, for any calendar day. The client also wants availability to be greater than 100% for any 5 consecutive minute period between the hours of 8:00 a.m. through 12:00 a.m. for any calendar week. The client then wants the total compliance for the above-conditions to be greater than 98% for the month. This SLA translates into the following non-compliance statement:

Response Time >5 second of normal response time for any 10 consecutive minute period between the hours of 8:00 a.m. through 5:00 p.m. for any calendar day between Monday and Friday and Availability <100% for any 5 consecutive minute period between the hours of 8:00 a.m. through 12:00 a.m. for any calendar week with a total compliance >98% for the calendar month.

This non-compliance statement is used to define the different parts of the SLA 20 as follows:

| SLO Conditions | |
|---|---|
| ID: | The SLO Condition resource identifier |
| Type: | { Static, Variable } If the Condition is variable, the desired statistic must also be selected (e.g., Minimum, Maximum, Average, Median, etc.). |
| Baseline Statistic: | {Minimum, Maximum, Average, Median} |
| Operator: | {GT, LT, GTE, LTE, NEQ, EQ, Envelope} |
| Boundary: | Value relative to type; |
| UpperLowerBound: | the delta wrt the Boundary that determines an UpperBound (Statistic + Boundary) and the LowerBound (Statistic − Boundary). This is for Envelope conditions. |
| UOM: | Unit of Measure {Seconds, Minutes, Hours, %, ...} |
| Grace: | Time allowed for a Condition to be crossed before becoming non-compliant. |

-continued

SLO Conditions

| SLO Name | Type | Operator | Boundary | Statistic | Grace Period | Grace Per UOM |
|---|---|---|---|---|---|---|
| >5 Sec above the Average for 10 Min. | Variable | GT | 5 | Average | 10 | Minutes |
| <100% for 5 Min | Static | LT | 100 | n/a | 5 | Minutes |

Note that in the above examples, since the "envelope" operator is not used the upper and lower boundaries are N/A.

SLO TimeSpecs

| ID: | The SLO Time Spec resource identifier |
|---|---|
| Operating Period: | Default is Year-Round (Jan–Dec), every year |
| Operating Days: | Default is entire Week (Sun–Sat) |
| Operating Hours: | Default is around the clock (24 hours) |

| Name | Operating Period | Operating Days | Operating Hours |
|---|---|---|---|
| YearRoundWorkWeek | Jan 1–Dec 31 | Monday–Friday | 8:00 AM–5:00 PM |
| 8toNoon | Jan 1–Dec 31 | Sunday–Saturday | 8:00 AM–12:00 AM |

SLOs (for 2 Servers, Server 1 and Server 2)

| ID: | The SLO identifier |
|---|---|
| Measurement: | Same as that specified in Service Model |
| Condition: | ID of condition resource |
| SLO TimeSpec: | ID of SLO time spec resource |

| Name | Measurement Name | Condition | SLO TimeSpec |
|---|---|---|---|
| S1RT | Server1:ResponseTime | >(Average + 5 Sec) for 10 Min | YearRoundWorkWeek |
| S1Avail | Server1:Availability | <100% for 5 Min | 8toNoon |
| S2RT | Server2:ResponseTime | >(Average + 5 Sec) for 10 Min | YearRoundWorkWeek |
| S2Avail | Server2:Availability | <100% for 5 Min | 8toNoon |

SLO Expressions

| ID: | The SLO identifier |
|---|---|
| Expression: | Logical expression used in computing compliance across SLOs |

| ID | Expression |
|---|---|
| E1 | S1RT AND S1 Avail |
| E2 | S2RT AND S2 Avail |
| E3 | E1 OR E2 |

SLAs

| ID: | SLA identifier |
|---|---|
| Type: | Specifies whether the computation is relative to a calendar unit of time or from the "anniversary" of when the SLA was enforced |
| Expression: | ID of expression |
| SLA Conformance Period: | The conformance period for the SLA |
| Compliance Percentage: | Specifies a percentage that all the aggregated compliance of the underlying SLOs must fall within; default is 100% |

| SLA Name (ID) | Customer | Type | Expression | Conformance Period | Compliance Percentage | Contract Date |
|---|---|---|---|---|---|---|
| MyWeb Service | Acme Plus | Calendar | E3 | Month | 98% | June 7, 1999 |

It can be seen from this example that SLOs can be logically combined to obtain multiple SLO results, which may then be logically combined to evaluate SLA compliance. Therefore, the SLA expression need not be a simple logical combination of, for example, two SLOs, but maybe a logical combination of two or more SLO results, with each SLO result corresponding to a combination of two or more SLOs.

In accordance with the present invention, SLAs can be defined using SLA templates that are customizable with specific attributes such as, for example, customer name, overall compliance value, specific resources, etc. This enables customer-specific SLAs to be created automatically from information retrieved from a customer database or provisioning system. By using SLA templates, the need for defining SLAs on a per customer basis is eliminated. Defining new SLAs on a per customer basis becomes unmanageable as the ISPs business grows in extremely large numbers. Offering pre-packaged, but different levels of service, provides an alternative approach that maintains segmentation, but relieves the heavy management and reporting burden. Customers can select, and pay accordingly for, the level of service they desire.

SLA templates are simply reusable SLAs that are comprised of a set of pre-defined attributes, along with a few undefined attributes. The undefined attributes are customer-specific attributes that need to be defined for the particular customer. Another advantage of providing the capability of using SLA templates is that it enables a definition to be changed in one location (i.e., in a master template) that will result in the change being made over the entire customer base. For example, if a response time condition needs to be changed from two to three seconds, assuming 1,000 customers require the change, only one change needs to be made, not 1,000.

Once the SLAs have been configured, they will be stored on the diagnostic/measurement server 1, preferably as object-oriented data structures. As stated above, the quality of service measurement data collected and stored by the diagnostic/measurement server 1 is stored on a time basis. When SLA reports are generated, time periods that the reports cover can be specified by an SLA manager to enable compliance with the SLAs to be determined over a specified time period. SLA reports can be generated at any time for any conformance periods, for multiple SLOs. The SLA reports can show SLA compliance, per-expression compliance, per-SLO compliance, violation times, and the underlying measurement data. SLA compliance can also be evaluated on a real-time, instant-by-instant basis and then utilized as a Firehunter tool measurement. This enables real-time monitoring and threshold comparison of SLA compliance, which enables the SLA manager to proactively take actions to ensure that SLA compliance is met.

FIG. 7 is a block diagram illustrating the relationships between the various components of the SLA management and reporting tool of the present invention, as well as the relationship between the SLA management and reporting tool of the present invention and the service model manager with which it is utilized. The SLA Management and Reporting Tool comprises an SLA manager 100, a measurement manager 102, a baseline manager 103, an SLA reporting practical user interface (GUI) 105 and an SLA reporting command line interface 106. The SLA manager 100, the measurement manager 102 and the baseline manager 103 preferably are all comprised as software modules that reside on the DMS 1 of the ISP.

SLAs and SLA reports can be configured by a user using the SLA user interface, such as a GUI 105. The SLAs and reports can be configured by making entries in various menus provided to the user by the SLA GUI 105. Alternatively, the SLAs and SLA reports may be configured by using a text editor to enter the appropriate SLA, SLO, and report information. Similar to a GUI 105, the SLA command line interface 106 may be utilized interactively or by scripts to generate SLA compliance reports. The SLA manager 100 then computes the compliance and outputs the corresponding report with measurement data to a file or to the user interface. The SLA reports may be displayed in a variety of formats (e.g., HTML or comma-separated values) by various tools (e.g., web browsers, spreadsheets, or third-party reporting applications, etc.). SLA Reports can also be stored away to a file for later viewing and processing.

A Report may vary from a high level summary to low level details simply by varying the configuration of the SLA Report properties. This capability allows the user to tailor reports for various roles within an ISP's environment, such as the CEO, the SLA Manager, and the Operations Manager. If the detailed properties are specified, convenient links are provided in the HTML format which allow the user to drill down to various levels for increasingly more detail. Thus, abstraction of detail is still provided even in the most detailed report. Such details include compliance on a per-expression basis, on a per-SLO basis, violation periods, and the actual data that caused the violation.

The SLA manager 100 comprises a compliance checker 104, which performs the SLA compliance evaluations. In order to perform the compliance evaluations, quality of service measurement (QoS) data, and, if necessary, baseline data derived from the (QoS) data, is obtained by the compliance checker 104. The measurement manager 102 and the baseline manager 103 control the storage and retrieval of the QoS measurement data and the baseline data, respectively. The measurement data is received by the measurement manager 102, which stores the measurement data at locations in its measurement database (not shown). The service model manager 101 configures the measurement manager 102 and the baseline manager 103 to store and retrieve the measurement data and the baseline data in the measurement database for the resources specified in the service model.

The measurement manager 102 and the baseline manager 103 retrieve the information requested by the SLA manager and provide the information to the SLA manager 100. The compliance checker 104 of the SLA manager then utilizes this information to evaluate the SLOs and to perform the SLA expression calculations to determine SLA compliance. The SLO and SLA calculations are stored in the SLA database and are used to generate the SLA reports. All of the measurement data, baseline data, SLO compliance results and SLA compliance results are stored in the SLA database on a time basis. This enables all of this data to be correlated to a single instant in time or a particular period of time.

Figure 8A:
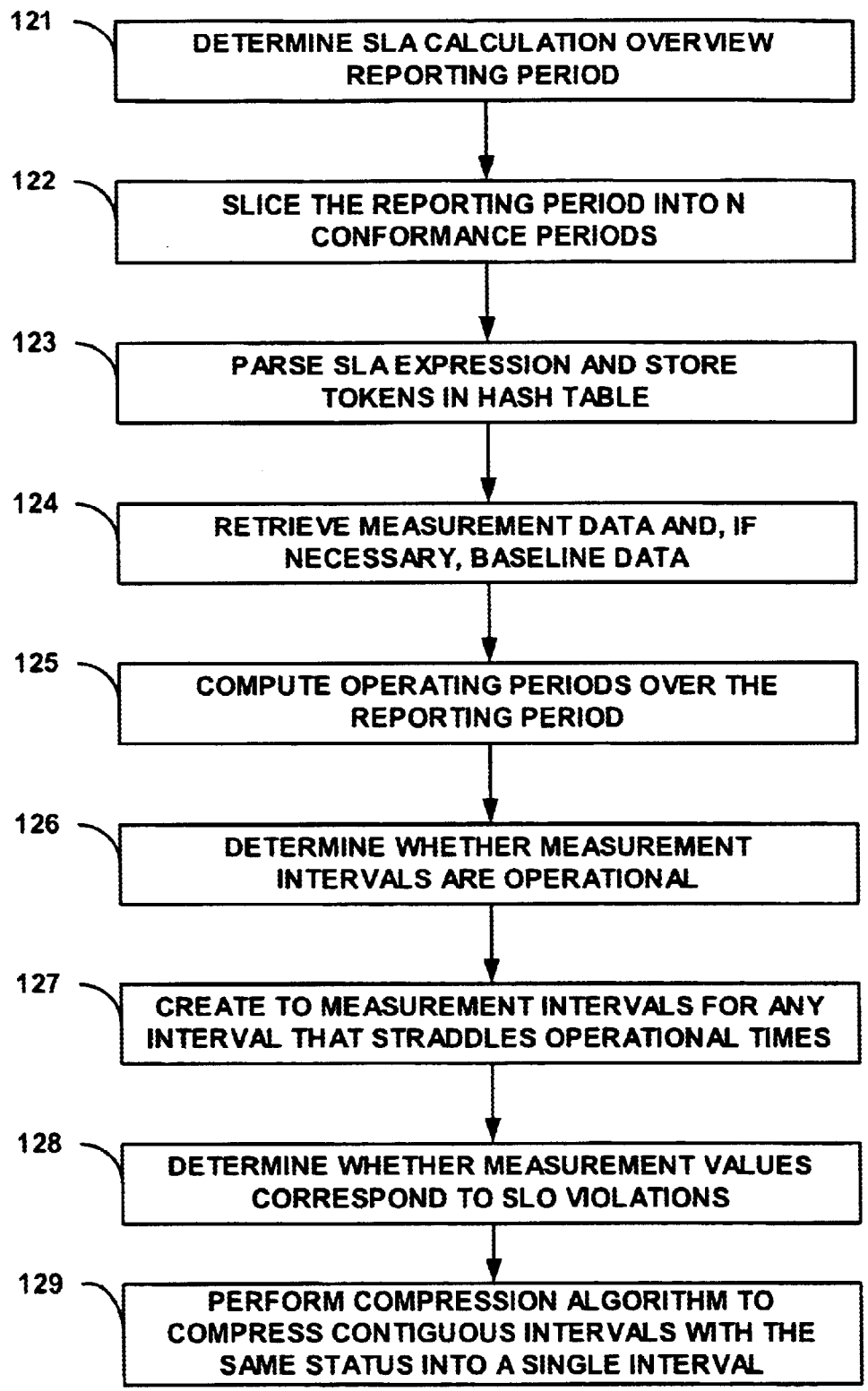
FIGS. 8A and 8B show the steps involved in performing a compliance calculation.
Figure 8B:
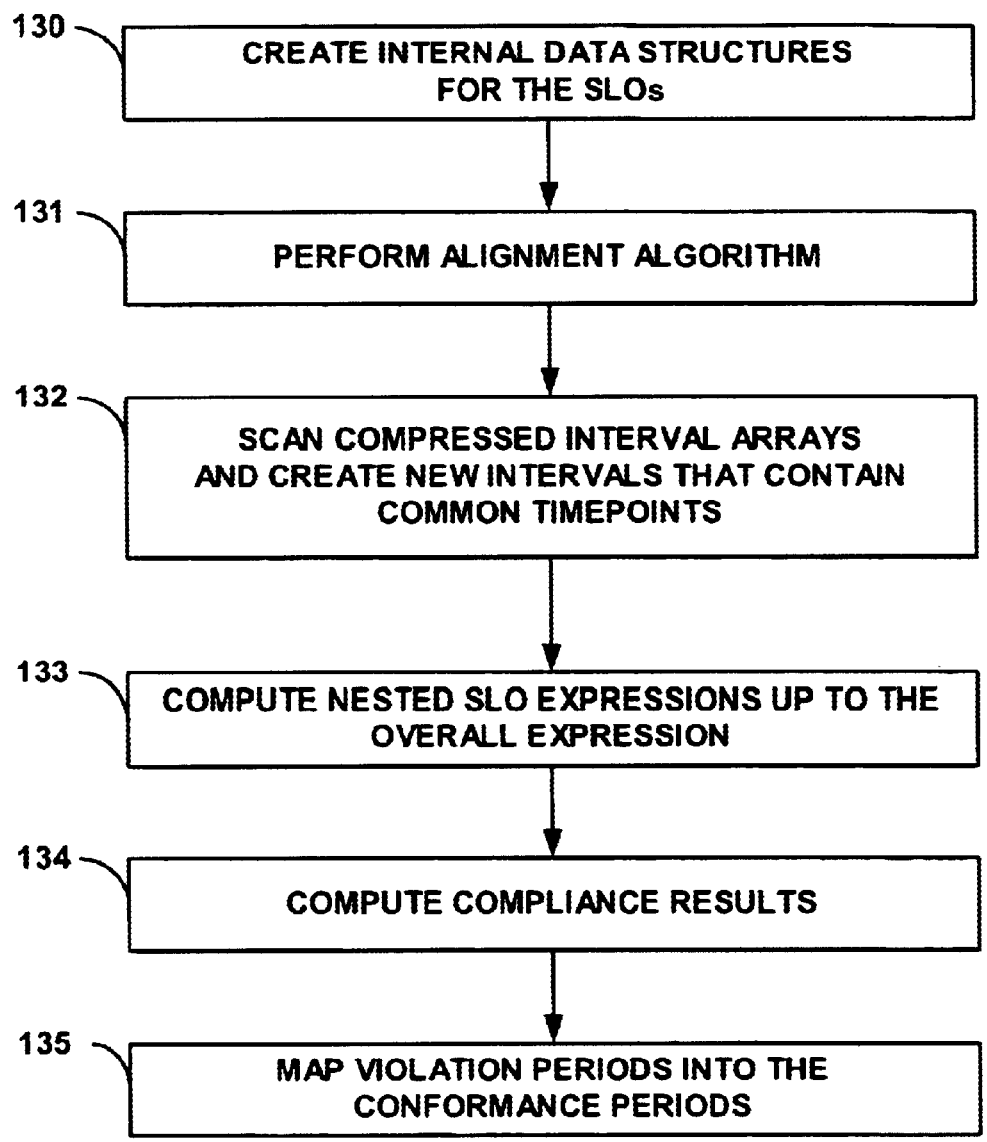

The manner in which the SLOs and the SLAs are calculated by the compliance checker 115 in accordance with the preferred embodiment will now be described in detail with reference to FIGS. 2, 8A and 8B. The first step in the process is to determine the SLA calculation overall reporting period, as indicated by block 121. The reporting period is the period of time over which SLA compliance will be evaluated. The reporting period is then sliced into n number of conformance periods 25 (FIG. 2), as indicated by block 122. The SLA expression is then parsed and the individual tokens associated with the SLO(s) are put into internal tables (not shown), as indicated by block 123. Each SLO is then computed in turn.

In order to compute the SLOs, data needed for the computations is retrieved from the measurement manager 102 or from the baseline manager 103, as indicated by block 124. Operating times 61–64, as defined by the SLO timespec. 33, are then computed over the reporting period based upon the SLO timespecs. 33, as indicated by block 125. Each measurement interval is then checked to determine whether it is or is not operational, i.e., to determine whether or not it falls within the operating period specified by the SLO timespec. 33. This step is represented by block 126. For any measurement interval that straddles operational times, multiple intervals are created, their lengths are recomputed, and each is marked as operational or non-operational. This step is represented by block 127.

Once the measurement intervals have been determined, the measurement value associated with each interval is checked to determine whether or not it corresponds to an SLO violation, as indicated by block 128. This check results in a True or False condition. A True condition result corresponds to no violation for that interval and a False condition result corresponds to a violation for that interval. A compression algorithm is then invoked that analyzes the results of the various determinations made with respect to each interval to determine the operational and violation statuses of each interval. The compression algorithm compresses any contiguous intervals with the same status into a single interval. The tasks associated with the compression algorithm are represented by block 129. An internal data structure is then created for each SLO which identifies the SLO, the compressed and non-compressed intervals associated with the SLO, and an array of violation periods associated with the SLO. This step is represented by block 130.

Once these data structures have been created, an alignment algorithm is invoked that creates a sorted array containing all unique time values across all SLOs, as indicated by block 131. The compressed interval array associated with each SLO is then scanned and new intervals are inserted that contain the common timepoints found in the compressed interval array, as indicated by block 132. The evaluation algorithm is then invoked that evaluates the nested SLO expressions up to the overall expression, as indicated by block 133. Since each SLO is time aligned, computing a nested expression is a straightforward process, e.g. True AND True=True, True AND False=False, True OR False= True, etc. The end result of the nested expression calculations will be an array of True and False values.

Compliance results are then computed for the SLA, for each nested expression, and for each SLO across all conformance periods, as indicated by block 134. Compliance results are simply the amount of compliant time (i.e., total True time summed up across the array) divided by the Conformance Period time. For each SLO, its violation periods are associated with individual conformance periods, and retained for inclusion in SLA reports. This is done merely for reporting purposes so that each conformance period contains its own violation periods. In other words, violation periods may overlap between conformance periods, so adjustments need to be made from a reporting perspective.

The apparatus of the present invention is the DMS 1, which comprises a computer that is capable of being configured to perform all of the computations discussed above, and a memory device, which functions as a database for storing the data and code utilized by the DMS 1 in performing its tasks. The computer may comprise one or more microprocessors, for example. The memory device comprised by the apparatus of the present invention may be separate from the microprocessor(s) or it may be on-board memory contained on the microprocessor(s). The memory device is not limited to any particular type of memory device. Preferably, the memory device is a solid state memory device, but it may also be, for example, a CD ROM, magnetic disk, magnetic tape, etc., or any other suitable computer-readable medium.

It should also be noted that the present invention is not limited to any particular computer for performing the tasks of the present invention. The term "computer", as that term is used herein, is intended to denote any machine capable of performing the calculations, or computations, necessary to perform the tasks of the present invention. Therefore, the computer comprised by the DMS 1 may be any machine that is capable of performing the necessary tasks. Also, although the method of the present invention is preferably performed in software being executed by the DMS 1, those skilled in the art will understand that many of these tasks could also be performed solely in hardware. Therefore, the method of the present invention can be performed by software being executed by a computer, solely in hardware, or by a combination of hardware and software.

It should be noted that the present invention has been described with reference to the preferred embodiments and that the present invention is not limited to these embodiments. Those skilled in the art will understand that variations can be made to the embodiments discussed above that are within the scope of the present invention. For example, the SLA and SLO definitions shown in FIG. 2 can be modified without deviating from the scope of the present invention. The manner in which the individual SLOs and the associated SLA expressions can be computed is not limited to the embodiment discussed above with reference to FIGS. 8A and 8B. Those skilled in the art will understand that the method discussed above with reference to FIGS. 8A and 8B can be modified in a variety of ways to achieve the overall purposes of the present invention. These are only examples of modifications that may be made to the present invention without deviating from the scope thereof. Those skilled in the art will understand that many other modifications may be made to the embodiments discussed above that are within the scope of the present invention.

What is claimed is:

1. An apparatus for determining compliance with a Service Level Agreement (SLA), each SLA including at least one Service Level Objective (SLO), said at least one SLO being combined in a logical expression of the SLA, the apparatus comprising:

first logic, the first logic retrieving measurement data from a data source, the measurement data being associated with said at least one SLO;

second logic, the second logic evaluating the measurement data associated with said at least one SLO to determine whether said at least one SLO has been violated, said second logic generating SLO compliance results based on the evaluation of the measurement data; and third logic, the third logic using the SLO compliance results to evaluate the logical expression of the SLA, the third logic determining whether or not the SLA has been complied with based on the evaluation of the logical expression, wherein said at least one SLO comprises:

a measurement identification identifying a particular measurement with which said at least one SLO is associated;

a condition specification identifying a condition that the particular measurement must meet to prevent said at least one SLO from being violated;

a time specification identifying a time period over which said at least one SLO is to be evaluated to determine whether or not said at least one SLO has been violated, wherein the time specification includes an exclusion time, the exclusion time designating a time period during which the corresponding SLO is not to be evaluated for compliance; and a grace period corresponding to an interval of time over which said condition may be violated without resulting in a violation of said at least one SLO.

2. The apparatus of claim 1, wherein said condition specification includes an operator and a boundary, the operator and the boundary being used by the second logic to evaluate said measurement data to determine whether said at least one SLO has been violated.

3. The apparatus of claim 2, wherein the timing specification includes an operating period that corresponds to a period of time over which the SLO is to be evaluated for compliance.

4. The apparatus of claim 3, wherein the operating period includes operating days and operating hours, and wherein said measurement data is only evaluated for compliance during times in the operating period that correspond to operating days and operating hours.

5. The apparatus of claim 1, wherein the SLA includes an SLA name and a conformance period, the SLA name identifying the SLA, the conformance period corresponding to a time period over which the SLA is to be evaluated for compliance, and wherein the third logic only evaluates the logical expression of the SLA to determine whether or not the SLA has been complied with during the conformance period.

6. The apparatus of claim 5, wherein the SLA includes a compliance percentage, the compliance percentage corresponding to a percentage of time during which a determination by said third logic of non-compliance of said at least one SLA will be tolerated.

7. The apparatus of claim 6, wherein the compliance percentage can be less than 100%.

8. The apparatus of claim 1, further comprising fourth logic for configuring SLAs, each SLA being configured in accordance with user input, each SLA being associated with a customer identifier.

9. The apparatus of claim 1, further comprising fourth logic for configuring SLAS, each SLA being configured based on a previously-configured SLA template, each SLA being associated with a customer identifier.

10. The apparatus of claim 1, further comprising fourth logic for configuring SLAs, each SLA being configured based partially on a previously-configured SLA template and based partially on user input, each SLA being associated with a customer identifier.

11. The apparatus of claim 1, further comprising:

fourth logic, the fourth logic being configured to generate SLAs, each SLA being associated with a customer identifier; and fifth logic, the fifth logic being configured to generate SLA reports, each SLA report generated by the fifth logic being associated with a customer identifier.

12. An apparatus for determining whether or not Service Level Agreements (SLAs) have been complied with, each SLA including one or more Service Level Objectives (SLOs), each of said SLOs being combined in a logical expression of the SLA, the apparatus comprising:

first logic, the first logic being configured to retrieve measurement data from a data source, wherein each SLO has measurement data associated therewith, the first logic retrieving the measurement data associated with each SLO;

second logic, the second logic being configured to evaluate the measurement data associated with each SLO to determine whether any of the SLOs have been violated, said second logic generating SLO compliance results based on the evaluation of the measurement data; and third logic, the third logic being configured to use the SLO compliance results to evaluate the logical expression of the SLA, the third logic determining whether or not the SLA has been complied with based on the evaluation of the logical expression, wherein each SLO comprises:

a measurement identification identifying a particular measurement with which said at least one SLO is associated;

a condition specification identifying a condition that the particular measurement must meet to prevent said at least one SLO from being violated;

a time specification identifying a time period over which said at least one SLO is to be evaluated to determine whether or not said at least one SLO has been violated, wherein the time specification includes an exclusion time, the exclusion time designating a time period during which the corresponding SLO is not to be evaluated for compliance; and a grace period corresponding to an interval of time over which said condition may be violated without resulting in a violation of said at least one SLO.

13. The apparatus of claim 12, wherein said condition specification includes an operator and a boundary, the operator and the boundary being used by the second logic to evaluate the measurement data to determine whether any of the SLOs have been violated.

14. The apparatus of claim 13, wherein the timing specification includes an operating period that corresponds to a calendar period of time within any given year over which the SLO associated with the timing specification is to be evaluated for compliance.

15. The apparatus of clam 14, wherein the operating period includes operating days and operating hours, and wherein the measurement data associated with an SLO is only evaluated for compliance during times in the operating period that correspond to operating days and operating hours.

16. The apparatus of claim 12, wherein the SLA includes an SLA name and a conformance period, the SLA name identifying the SLA, the conformance period corresponding to a time period over which the SLA is to be evaluated for compliance, and wherein the third logic only evaluates the logical expression of the SLA to determine whether or not the SLA has been complied with during the conformance period.

17. The apparatus of claim 16, wherein the SLA includes a compliance percentage, the compliance percentage corresponding to a percentage of time during which a determination by said third logic that the SLA has not been violated will result in a determination by the third logic that the SLA is compliant.

18. The apparatus of claim 17, wherein the compliance percentage can be less than 100%.

19. The apparatus of claim 12, further comprising fourth logic for configuring SLAs, each SLA being configured in accordance user input, each SLA being associated with a customer identifier.

20. The apparatus of claim 12, further comprising fourth logic for configuring SLAs, each SLA being configured based on a previously-configured SLA template, each SLA being associated with a customer identifier.

21. The apparatus of claim 12, further comprising fourth logic for configuring SLAs, each SLA being configured based partially on a previously-configured SLA template and based partially on user input, each SLA being associated with a customer identifier.

22. The apparatus of claim 12, further comprising:

fourth logic, the fourth logic being configured to generate SLAs, each SLA being associated with a customer identifier; and fifth logic, the fifth logic being configured to generate SLA reports, each SLA report generated by the fifth logic being associated with a customer identifier.

23. A method for determining Service Level Agreement (SLA) compliance, each SLA including at least one Service Level Objective (SLO), said at least one SLO being combined in a logical expression of the SLA, the method comprising the steps of:

retrieving measurement data from a database, the measurement data being associated with said at least one SLO;

evaluating the measurement data associated with said at least one SLO to determine whether said at least one SLO has been violated;

generating SLO compliance results based on the evaluation of the measurement data;

utilizing the SLO compliance results to evaluate the logical expression of the SLA; and determining whether or not the SLA has been violated based on the evaluation of the logical expression of the SLA, wherein said at least one SLO comprises:

a measurement identification identifying a particular measurement with which said at least one SLO is associated;

a condition specification identifying a condition that the particular measurement must meet to prevent said at least one SLO from being violated;

a time specification identifying a time period over which said at least one SLO is to be evaluated to determine whether or not said at least one SLO has been violated, wherein the time specification includes an exclusion time, the exclusion time designating a time period during which the corresponding SLO is not to be evaluated for compliance; and a grace period corresponding to an interval of time over which said condition may be violated without resulting in a violation of said at least one SLO.

24. The method of claim 23, wherein said condition specification includes an operator and a boundary, the operator and the boundary being used during the step of evaluating the measurement data to determine whether said at least one SLO has been violated.

25. The method of claim 24, wherein the timing specification includes an operating period that corresponds to a period of time over which the SLO is to be evaluated for compliance.

26. The method of claim 25, wherein the operating period includes operating days and operating hours, and wherein said measurement data is only evaluated for compliance during times in the operating period that correspond to operating days and operating hours.

27. The method of claim 23, wherein the SLA includes an SLA name and a conformance period, the SLA name identifying the SLA, the conformance period corresponding to a time period over which the SLA is to be evaluated for compliance, and wherein the logical expression of the SLA is only evaluated during the conformance period.

28. The method of claim 27, wherein the SLA includes a compliance percentage, the compliance percentage corresponding to a percentage of time during which a determination that the SLA has not been violated will result in a determination that the SLA is compliant.

29. The method of claim 27, wherein the compliance percentage can be less than 100%.

30. The method of claim 23, further comprising the step of:

generating an SLA report, the SLA report including information relating to whether or not said at least one SLO has been violated and whether or not the SLA has been complied with over the conformance period.

31. A computer program for determining whether or not Service Level Agreements (SLAs) have been complied with, each SLA including at least one Service Level Objective (SLO), said at least one SLO being combined in a logical expression of the SLA, the computer program being embodied on a computer-readable medium, the program comprising:

a first code segment, the first code segment retrieving measurement data from a database, the measurement data being associated with said at least one SLO;

a second code segment, the second code segment evaluating the measurement data associated with said at least one SLO to determine whether said at least one SLO has been violated;

a third code segment, the third code segment generating SLO compliance results based on the evaluation of the measurement data;

a fourth code segment, the fourth code segment utilizing the SLO compliance results to evaluate the logical expression of the SLA;

a fifth code segment, the fifth code segment determining whether or not the SLA has been violated based on the evaluation of the logical expression of the SLA; and a sixth code segment, the sixth code segment receiving a specified time period identifying a time period over which an SLO is to be evaluated to determine whether or not the SLO has been violated, wherein the SLO includes an exclusion time designating a time period during which the corresponding SLO is not to be evaluated for compliance, and wherein the SLO includes at least a grace period corresponding to an interval of time over which said condition may be violated without resulting in a violation of said at least one SLO.

32. The computer program of claim 31, further comprising a seventh code segment, the seventh code segment generating an SLA report that includes SLA compliance results.

* * * * *